US008870043B2

(12) United States Patent
Strole

(10) Patent No.: US 8,870,043 B2
(45) Date of Patent: Oct. 28, 2014

(54) DIPPING BUDDY

(71) Applicant: Alvin Paul Strole, Alexandria, KY (US)

(72) Inventor: Alvin Paul Strole, Alexandria, KY (US)

( * ) Notice: Subject to any disclaimer, the term of this patent is extended or adjusted under 35 U.S.C. 154(b) by 0 days.

(21) Appl. No.: 13/987,377

(22) Filed: Jul. 18, 2013

(65) Prior Publication Data
US 2014/0021233 A1 Jan. 23, 2014

Related U.S. Application Data

(60) Provisional application No. 61/849,965, filed on Feb. 5, 2013, provisional application No. 61/741,458, filed on Jul. 19, 2012.

(51) Int. Cl.
B60N 3/10 (2006.01)
B60R 11/00 (2006.01)
B60N 3/00 (2006.01)

(52) U.S. Cl.
CPC .............. B60R 11/00 (2013.01); B60N 3/007 (2013.01); B60N 3/10 (2013.01)
USPC ............ 224/482; 224/556; 224/561; 224/564

(58) Field of Classification Search
USPC .............. 224/482, 545, 556, 560, 561, 148.4, 224/148.7, 926, 564
See application file for complete search history.

(56) References Cited

U.S. PATENT DOCUMENTS

| 2,628,054 | A | * | 2/1953 | Fazakerley | 248/311.2 |
| 4,730,760 | A | * | 3/1988 | Keller | 224/556 |
| 4,739,582 | A | * | 4/1988 | Cullinane | 47/41.12 |
| D303,454 | S | * | 9/1989 | Morales et al. | D12/420 |
| 5,114,108 | A | * | 5/1992 | Olschansky | 248/311.2 |
| 5,667,119 | A | * | 9/1997 | Florence | 224/482 |
| 5,785,222 | A | * | 7/1998 | Basso et al. | 224/555 |
| 6,484,989 | B1 | * | 11/2002 | Connery | 248/311.2 |
| 2012/0138648 | A1 | * | 6/2012 | Moceo, II | 224/482 |

* cited by examiner

Primary Examiner — Justin Larson

(57) ABSTRACT

The invention is a assembly comprising of a flexible holding bracket and a tray. The bracket fit down between the window and rest on top of the door panel. The flexible backward s bracket fit's the inside part of the door panel for stability. At the end of the holding bracket is a tab for the tray with a slot in it to slide onto. The tray can be made with various types of reservoir combinations for holding different condiment packs.

5 Claims, 7 Drawing Sheets

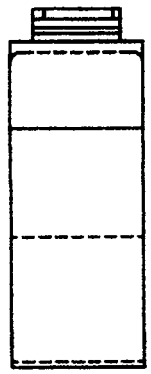
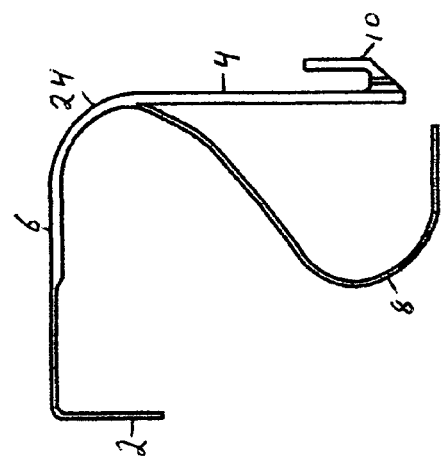
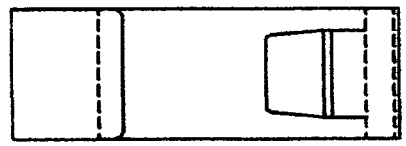
FIG 1

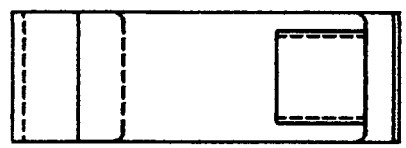
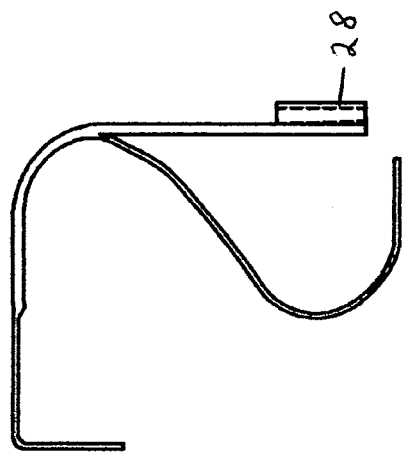
FIG 6

DIPPING BUDDY

FIELD OF THE INVENTION

Holding Device For Fast Food Dipping Sauces

BRIEF SUMMARY OF THE INVENTION

The invention is a device for holding dipping sauce packets. The holding device fits on the inside of the door panel and can be used in cars, trucks, recreational vehicles and more.

REFERENCE NUMBERS IN THE DRAWINGS

2. Side piece fits between window and door panel.
4. Piece coming down along side door panel.
6. Piece going across the top of the door panel.
8. Flexible backward [s] bracket.
10. Tab on the bracket for holding the tray.
12. Sauce tray.
14. Raised lip around the tray.
16. Circular opening/reservoir.
18. Large square/rectangle opening/reservoir.
20. Slot on the tray to fit on the bracket tab.
22. Medium square/rectangle opening/reservoir.
24. Dipping buddy bracket.
26. Small square/rectangle opening/reservoir.
28. Slot on the bracket to hold the tab that is on the tray.
30. Tab on tray to fit the slot on the bracket.

BRIEF DESCRIPTION OF THE DRAWINGS

FIG. 1 Is a view of the invention showing the bracket at different angles with the tab at the end.

FIG. 6 Is a view of the invention showing the bracket at different angles that could also be made with a slot at the end.

Tray holders #1-4 can also be made with the tab on the tray.

DETAILED DESCRIPTION OF THE INVENTION

The sauce holder [FIG. 1 #24] is a device that is made to fit over the interior front and back door panels of cars, trucks, recreational vehicles and more. The holder [FIG. 1 #2] fits between the window and the door panel, then comes out over the top of the door panel [FIG. 1 #6], then drops down along side the door panel [FIG. 1 #4]. There is a flexible bracket [FIG. 1 #8] that fits against the door panel and helps keep the sauce holder steady and level. With the flexible bracket it allows the device to fit a variety of door thicknesses.

Figure 2:
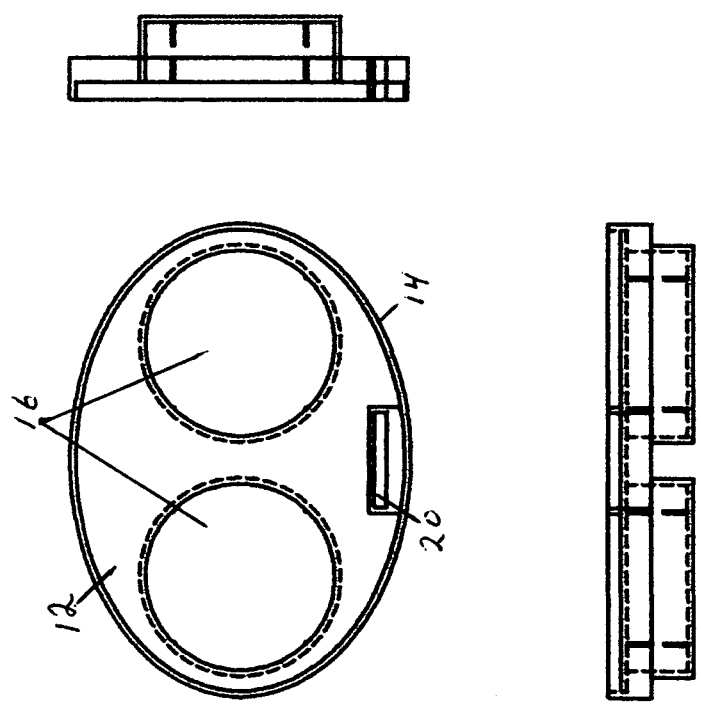
FIG. 2 Is a view of the invention showing tray holder #1 with the two circular reservoirs and the slot in the tray.
Figure 3:
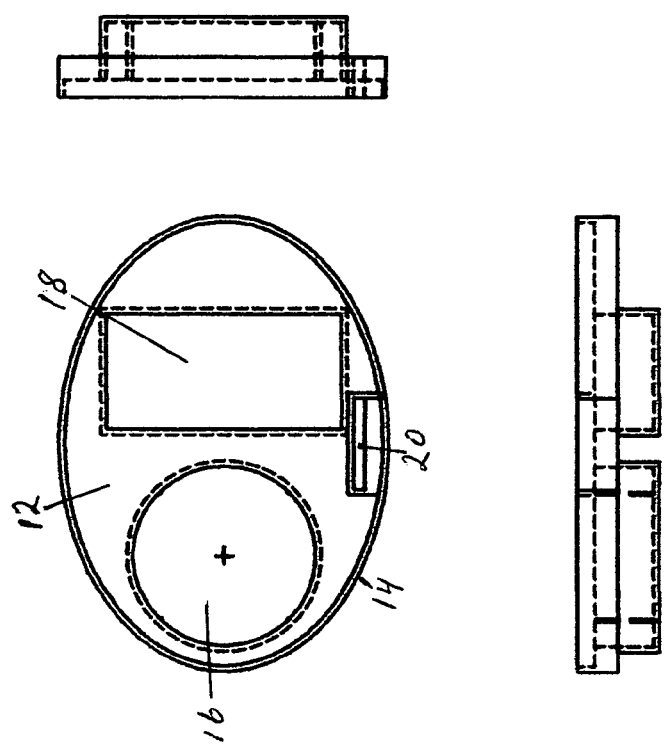
FIG. 3 Is a view of the invention showing tray holder #2 with one circular and one rectangular reservoir and slot in the tray.
Figure 4:
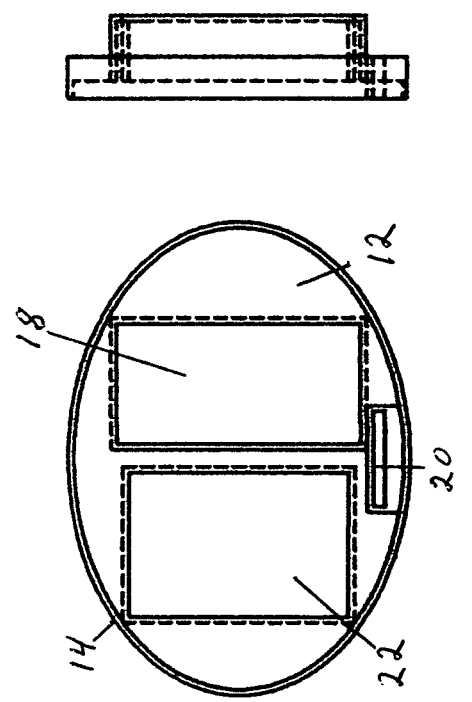
FIG. 4 Is a view of the invention showing tray holders #3 with one medium and one large rectangular reservoir and slot in the tray.
Figure 5:
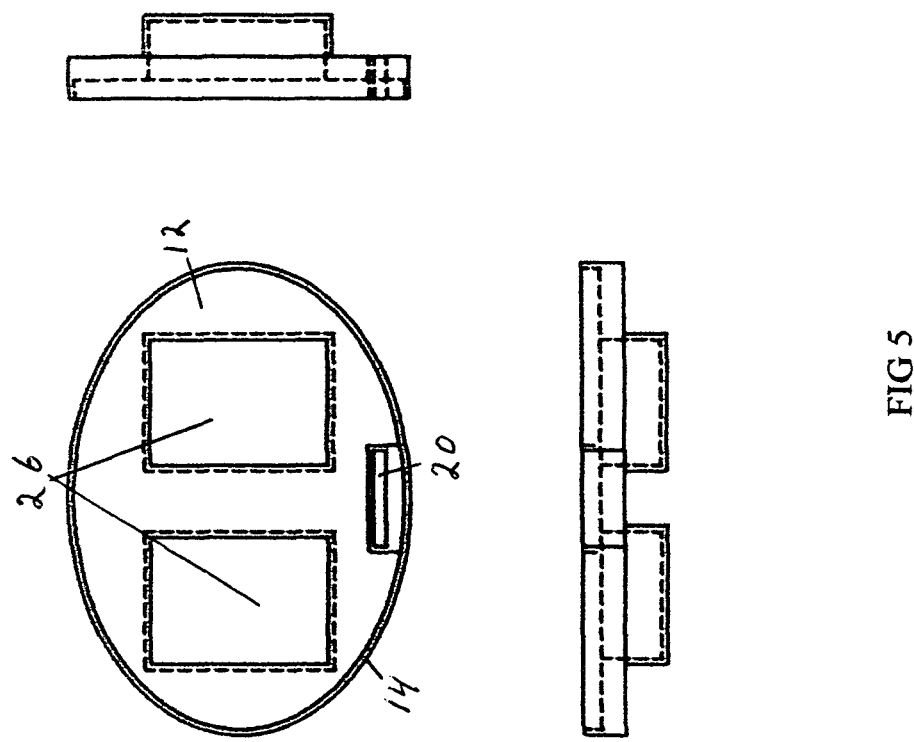
FIG. 5 Is a view of the invention showing tray holder #4 with two small rectangles/squares/reservoirs and slot in the tray.

At the end of the bracket is a tab [FIG. 1 #10]. This tab fits through the open slots that are in the trays [FIGS. 2, 3, 4 & 5 #20]. These sauce trays can come in many different shapes square, rectangular, circular, kidney, or oval as shown in [FIGS. 2, 3, 4 & 5]. The trays can have different reservoir combinations that hold the sauce packets. These are shown in [FIG. 2 #16 & FIG. 3 #16 & #18 FIG. 4 #18 & #22 FIG. 5 #26

Around the outside of the tray and around the slot opening on the tray is a raised lip. This raised lip will help contain any spillage that may occur.

This sauce holder could also be made as a one piece unit.

Dimensions for the sauce holder are as follows using [FIG. 1]. #2 is 1½ inches long, 1½ inches wide, 1/16 inches thick. #4 is 4⅜ inches long, 1½ inches wide, ⅛ of an inch thick. #6 is 3¾ inches long, 1½ inches wide, 1/6 to ⅛ of an inch thick. #8 starts out 8 inches long 1½ inches wide, 1/16 of an inch thick. When compressed into the backward [s] shape it measures 4¼ inches from top to bottom. #10 the tab is attached and centered at the bottom of #4. The tab is ¼ of an inch out away from #4. The tab is 1 inch wide at the bottom and tapers to ⅞ of an inch at the top and is ⅛ of an inch thick.

Figure 7:
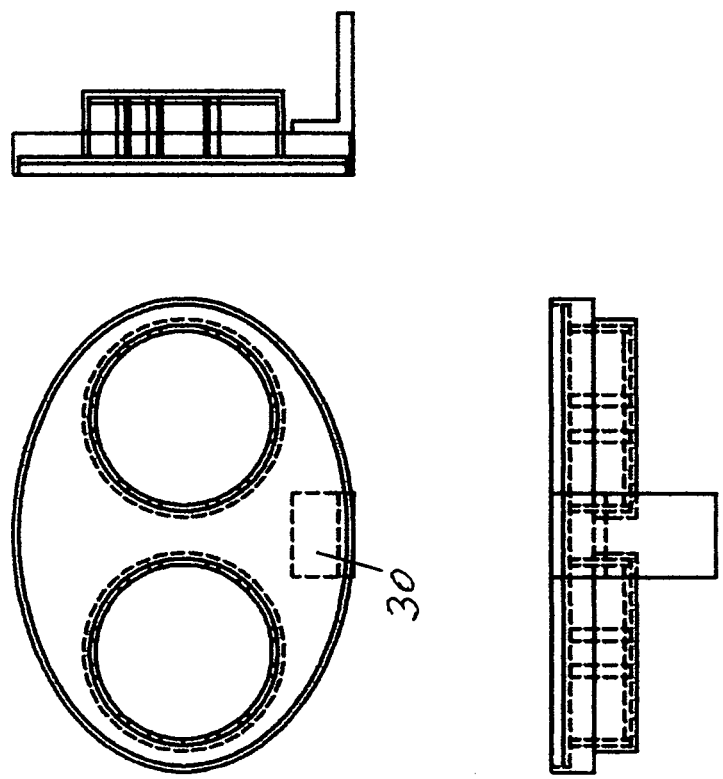
FIG. 7 Is a view of the invention showing tray holder #5 with two circular reservoirs and the tab on the tray.

Dimensions for the oval tray shown in [FIGS. 2, 3, 4 & 5] are as follows. #12 is 4 15/16 inches long at center points, 3½ inches wide at center points, and ¼ of an inch thick. The reservoir for holding the dipping sauce cups is 7/16 of an inch deep. On the tray #20 is the slot that fit down on the tab shown in [FIG. 1 #10]. The slot #20 measures 1 inch long, ⅛ of an inch wide. #14 is a raised lip measuring 3/16 of an inch high and 1/16 of an inch thick that goes around the outside of the tray #12. IN [FIG. 2 #16] showing the two circular reservoirs they measure 2 inches in diameter and 7/16 of an inch deep. IN [FIG. 3] showing the one circular and the one large square. #16 is 2 inches in diameter and the large square is 2½ inches long and 1⅜ inches wide. Both reservoirs are 7/16 of an inch deep. In [FIG. 4] showing one medium and one large square/rectangle opening. #22 is 2¼ inches long and 1½ inches wide, #18 is 2½ inches long and 1⅜ inches wide. The reservoirs are 7/16 inches deep. In [FIG. 5] showing the two small square openings #26 is 1 13/16 inches long and 1 5/16 inches wide. The reservoirs are 7/16 inches deep. The sauce holder can also be made with a slot at the end of the bracket [FIG. 6 #28]. The sauce trays can be made with tabs [FIG. 7 #30] that slide down into the slot on the bracket [FIG. 6 #28]. The dimensions for the slot in [FIG. 6 #28] is 15/16 of an inch wide 1 inch high the opening is 3/16 inches. The dimensions for the tabs on the sauce trays [FIG. 7 #30] are as follows ⅞ of an inch wide 1 11/16 inches high 5/32 of an inch thick.

I claim:

1. An apparatus for supporting a dipping sauce holder within a motor vehicle, said apparatus consisting of:
   a flexible bracket for mounting on a vehicle car door, said flexible bracket including a vertical side piece, a horizontal top piece with a first end extending from a top of said vertical side piece, a second end of said horizontal top piece branching downward into a vertical tray supporting member and an S-shaped arm; and
   a tray including different types of reservoirs for condiment packs.

2. The apparatus of claim 1, wherein said bracket and said tray are made of plastic.

3. The apparatus of claim 1, wherein said tray supporting member includes a tab for mounting the tray.

4. The apparatus of claim 3, wherein said tray includes a slot for receiving said tab.

5. The apparatus of claim 1, wherein said tray includes a raised lip along an outer edge thereof to contain any spillage.

* * * * *